| (12) | United States Patent | (10) Patent No.: | US 9,862,445 B2 |
|---|---|---|---|
| | Chuang | (45) Date of Patent: | Jan. 9, 2018 |

(54) WATER BOTTLE CAGE WITH TIRE LEVER

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 0 days.

(21) Appl. No.: 15/159,861

(22) Filed: May 20, 2016

(65) Prior Publication Data

US 2017/0066493 A1 Mar. 9, 2017

(30) Foreign Application Priority Data

Sep. 4, 2015 (TW) .............................. 104129323 A

(51) Int. Cl.
*B62J 11/00* (2006.01)
*B62J 9/02* (2006.01)

(52) U.S. Cl.
CPC .................... *B62J 11/00* (2013.01); *B62J 9/02* (2013.01)

(58) Field of Classification Search
CPC ..................................... B62J 11/00; B62J 9/02
USPC ........................................................ 224/414
See application file for complete search history.

(56) References Cited

U.S. PATENT DOCUMENTS

| 5,145,138 | A | | 9/1992 | Schlanger et al. | |
|---|---|---|---|---|---|
| D346,996 | S | * | 5/1994 | Blackburn ................... | D12/411 |
| 6,357,708 | B1 | * | 3/2002 | Carson ..................... | B62J 11/00 |
| | | | | | 248/229.1 |
| 6,543,660 | B2 | * | 4/2003 | Young ...................... | B62J 11/00 |
| | | | | | 224/282 |
| 6,854,629 | B1 | * | 2/2005 | Sartore .................... | B62J 11/00 |
| | | | | | 220/737 |
| 6,932,255 | B2 | * | 8/2005 | Van Houtte .............. | B62J 11/00 |
| | | | | | 224/414 |
| 8,191,844 | B2 | * | 6/2012 | Pennino ................... | B62J 11/00 |
| | | | | | 215/386 |
| 2011/0121044 | A1 | * | 5/2011 | Schopf .................... | B62J 9/005 |
| | | | | | 224/414 |
| 2013/0307246 | A1 | * | 11/2013 | Jankura ................... | B62J 11/00 |
| | | | | | 280/281.1 |

FOREIGN PATENT DOCUMENTS

| TW | 329200 U | 4/1998 |
|---|---|---|
| TW | 532340 U | 5/2003 |
| TW | M397938 U | 2/2011 |

* cited by examiner

*Primary Examiner* — Derek Battisti
(74) *Attorney, Agent, or Firm* — Alan D. Kamrath; Kamrath IP Lawfirm, P.A.

(57) ABSTRACT

A water bottle cage for a bicycle includes a bracket extending along a first axis and adapted to be attached to a frame of a bicycle. The bracket includes two first sides spaced from each other about a second axis perpendicular to the first axis and a second side connected with the two first sides and facing a receiving space adapted for receiving a water bottle. The bracket further includes at least one attaching device arranged on one of the two first sides, and at least one tire lever is removably attached to the attaching device. The tire lever can be removed from the attaching device without the need to move the water bottle away from the receiving space.

5 Claims, 6 Drawing Sheets

WATER BOTTLE CAGE WITH TIRE LEVER

BACKGROUND OF THE INVENTION

The present invention relates to a water bottle cage for a bicycle and, more particularly, to a water bottle cage including at least one tire lever removably attached thereon.

Taiwan Utility Patent No. M397,938 discloses a water bottle cage including a body (11). A side of the body (11) corresponding to an end face of a bicycle frame (A) has a threaded hole (12), and a face of another side of the body (11) forms a storing portion (13) for accommodating tools, such as a tire lever (B). The body (11) includes two limit arms (14) extended from two opposite sides thereof to secure a water bottle (C), and a containing box (15) located at a bottom side of the body (11) and having a lid (151).

However, when the rider desires to use the tire lever (B), the rider has to take out the water bottle from the body (11) first, and then, the tire lever (B) can be allowed to be removed from the storing portion (13) for operation. Conversely, when the tire lever (B) has been used, the rider has to attach the tire lever (B) to the storing portion (13) and then reattach the water bottle (C) to the body (11). It is quite troublesome and inconvenient to riders.

Thus, a need exists for a novel water bottle cage that mitigates and/or obviates the above disadvantages.

BRIEF SUMMARY OF THE INVENTION

The present invention solves this need and other problems in the field of water bottle cages by providing a water bottle cage comprising:
  a bracket extending along a first axis and adapted to be attached to a frame of a bicycle, with the bracket including two first sides spaced from each other about a second axis perpendicular to the first axis and a second side connected with the two first sides and facing a receiving space adapted for receiving a water bottle, with at least one attaching device arranged on one of the two first sides; and
  at least one tire lever removably attached to the attaching device.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
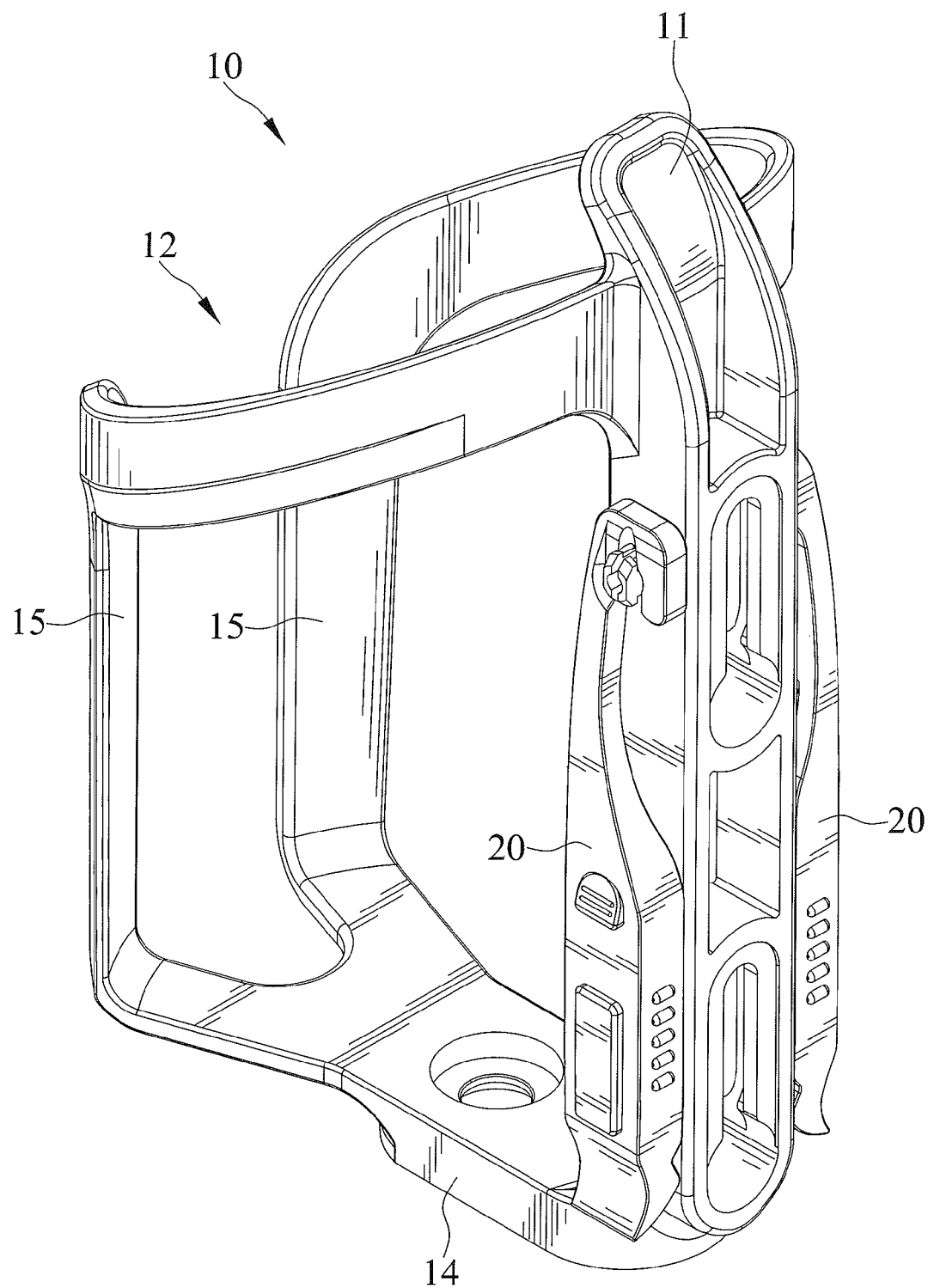
FIG. 1 shows a perspective view of a water bottle cage according to the present invention.
Figure 2:
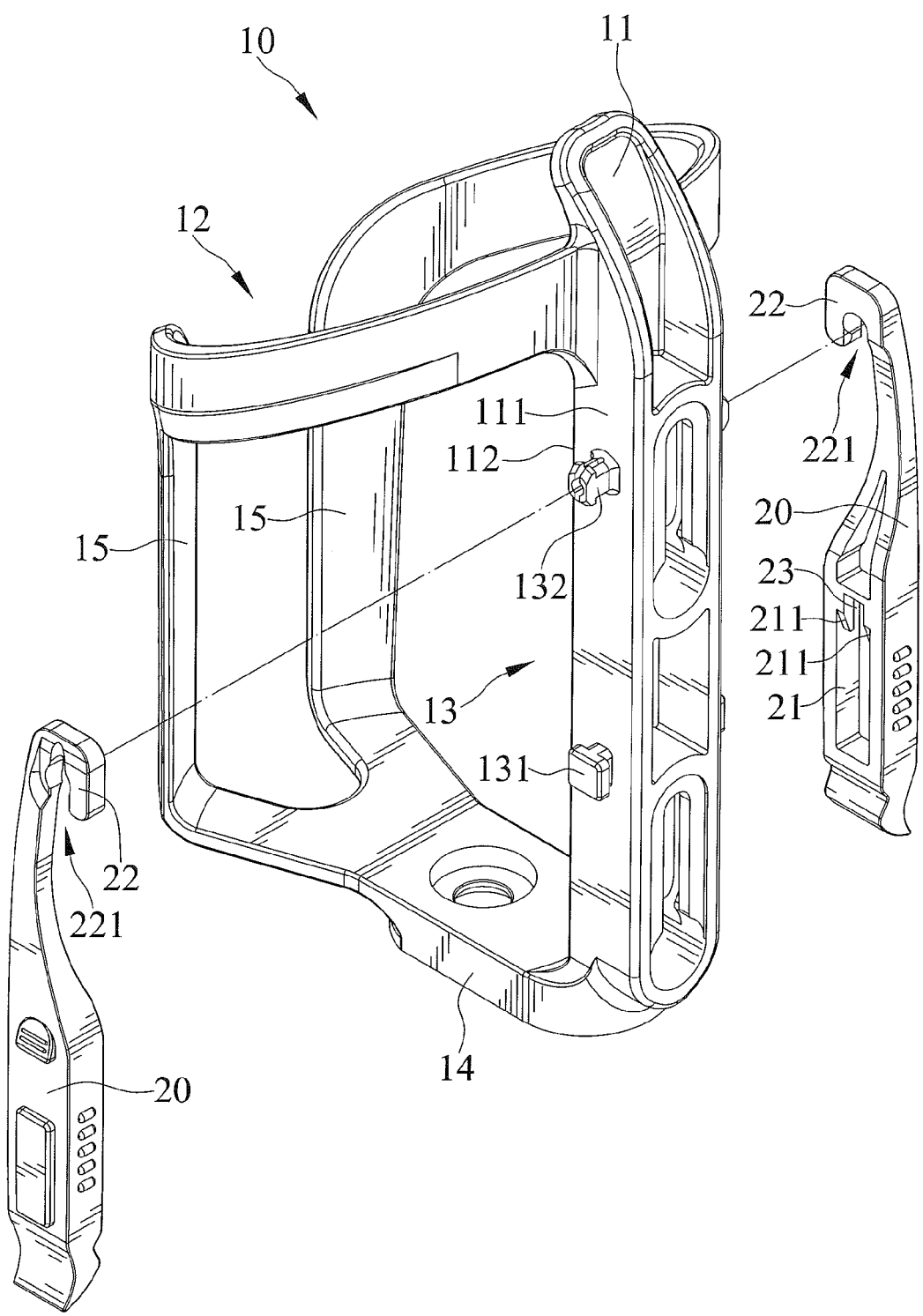
FIG. 2 shows an exploded, perspective view of the water bottle cage of FIG. 1.
Figure 3:
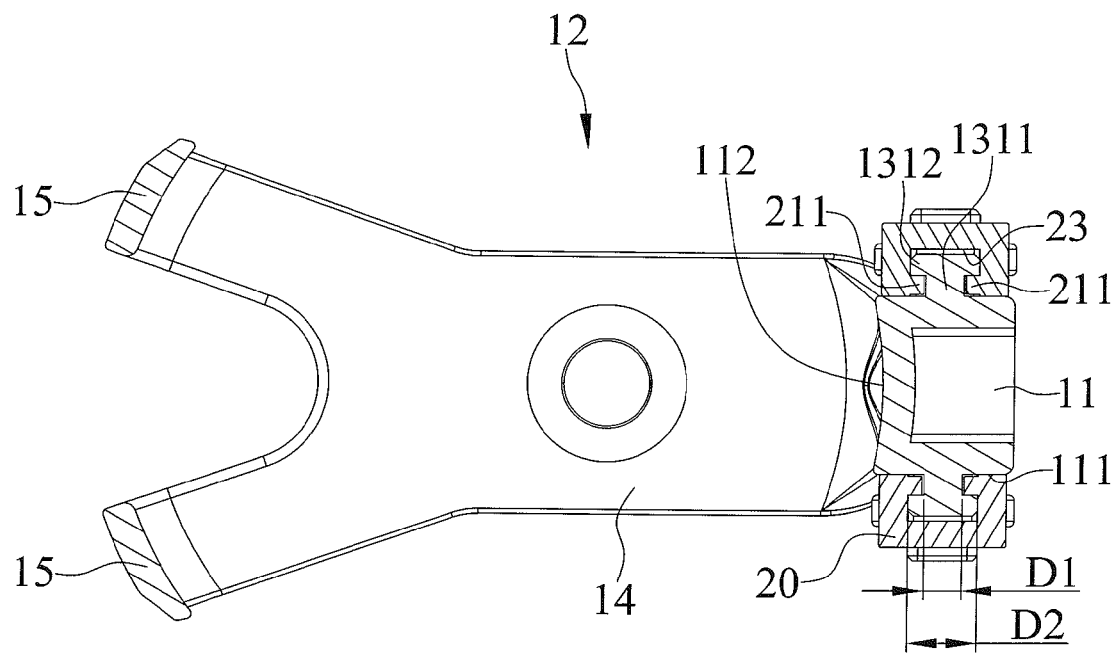
FIG. 3 shows a cross sectional view of the water bottle cage of FIG. 1.
Figure 4:
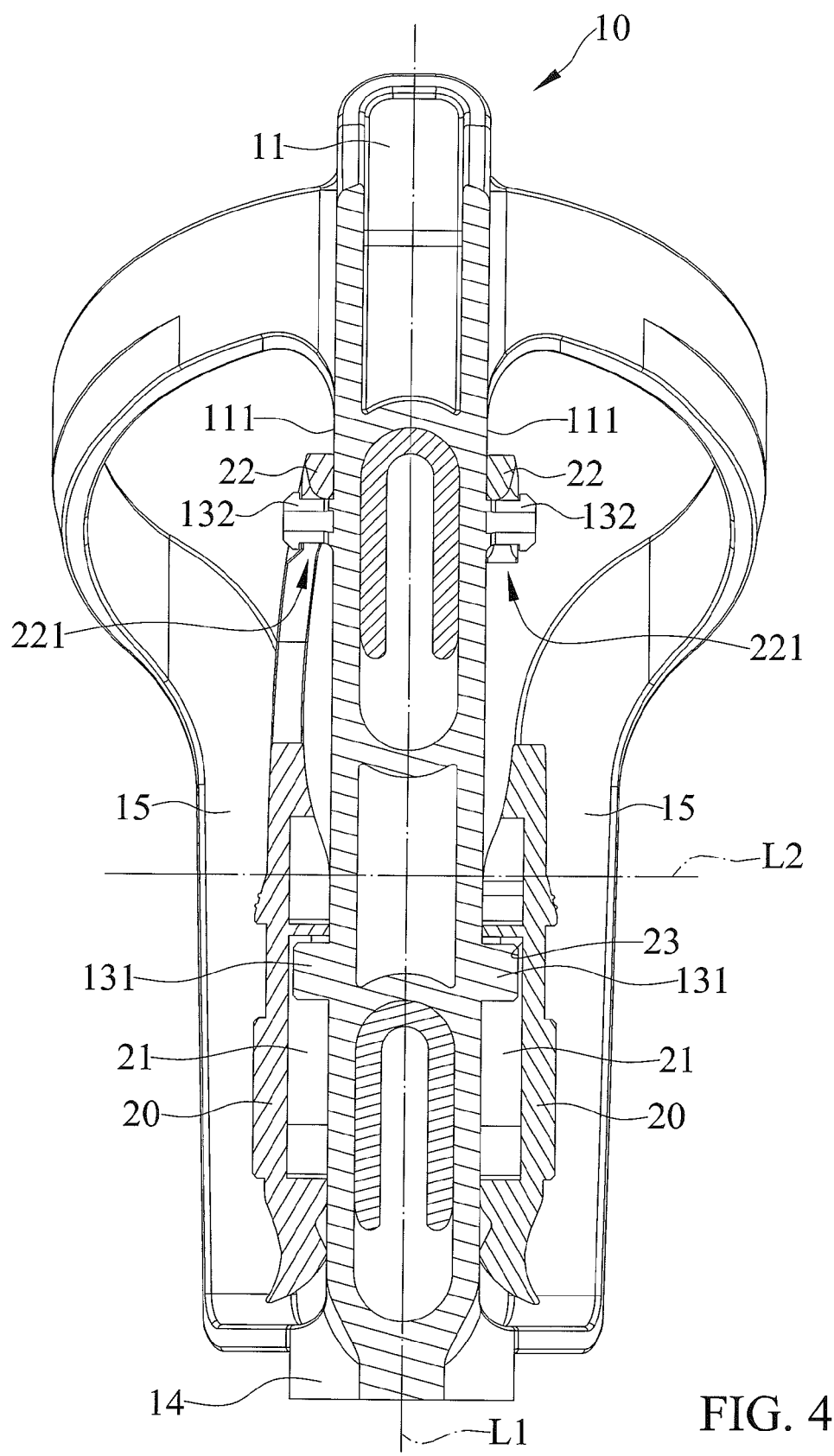
FIG. 4 shows another cross sectional view of the water bottle cage of FIG. 1.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "third", "fourth", "end", "portion", "longitudinal", "radial", "diameter", "width", "thickness", and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE INVENTION

FIGS. 1-6 show a water bottle cage 10 according to the present invention. The water bottle cage 10 includes an elongated bracket 11 extending along a first axis L1 and adapted to be attached to a frame of a bicycle (not shown). The bracket 11 is substantially rectangular and includes two first sides 111 spaced from each other about a second axis L2 perpendicular to the first axis L1, and a second side 112 connected with the two first sides 111 and facing a receiving space 12 adapted for receiving a water bottle (not shown).

The cage 10 further includes at least one attaching device 13 arranged on one of the two first sides 111. In the embodiment, two attaching devices 13 are respectively arranged on the two first sides 111 of the bracket 11. The attaching device 13 includes a first convex portion 131 and a second convex portion 132 both extending from the first side 111. The first convex portion 131 includes a first section 1311 and a second section 1312 integrally connected to each other. The first section 1311 is located between the first side 111 and the second section 1312. In the embodiment, the first section 1311 has a square cross section, and the second section 1312 has a rectangular cross section. Further, a first width D1 of the first section 1311 is smaller than a second width D2 of the second section 1312.

The cage 10 further includes a support 14 formed with a bottom end of the bracket 11, and two symmetrical struts 15 each having a bottom end integrally formed with one end of the support 14 distal the bracket 11 and a top end integrally formed with respective first side 111 of the bracket 11. Therefore, the second side 112, the support 14, and the two struts 15 form the receiving space 12. Additionally, the first convex portion 131 is located adjacent to the support 14 and the bottom end of the bracket 11, and the second convex portion 132 is located distal to the support 14 and adjacent to the top end of the respective strut 15.

The cage 10 further includes at least one tire lever 20 removably attached to the attaching device 13. In the embodiment, two tire levers 20 removably attached to the two attaching devices 13.

The tire lever 20 includes a slot 21 removably engaged with the first convex portion 131 of the attaching device 13 and including two shoulder portions 211 extended from a lateral wall of the slot 21.

The tire lever 20 includes a hooked portion 22 having an opening 221 removably engaged with the second convex portion 132 of the attaching device 13.

The tire lever 20 further includes a joint portion 23 formed between the two shoulder portions 211 and a bottom of the slot 21 to engage with the second section 1312 of the first convex portion 131. Additionally, the two shoulder portions 211 are both abutable against the first section 1311.

Figure 5:
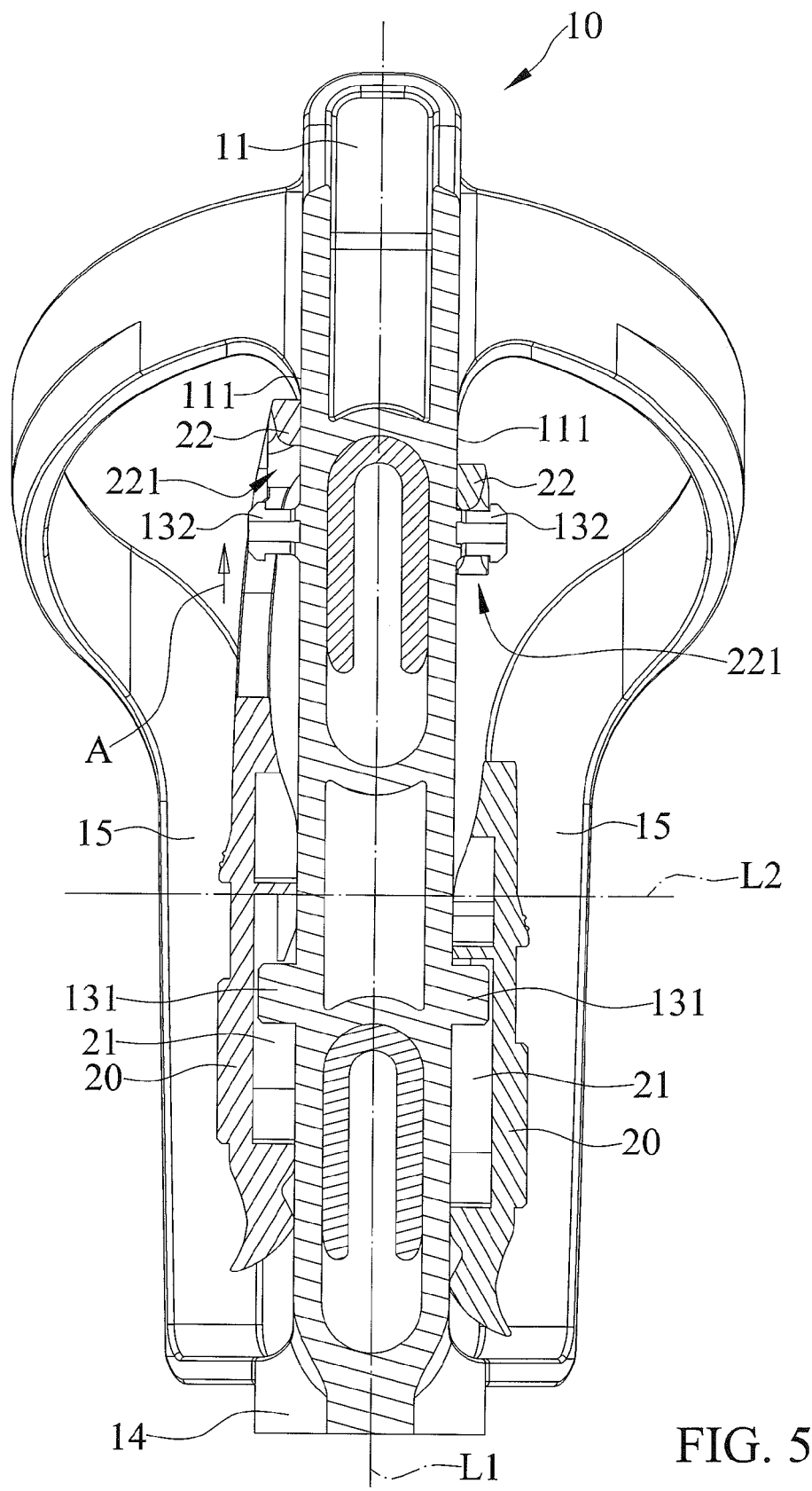
FIG. 5 is a continued view of FIG. 4, and illustrates a tire lever removed from an attaching device along a direction indicated by an arrow.
Figure 6:
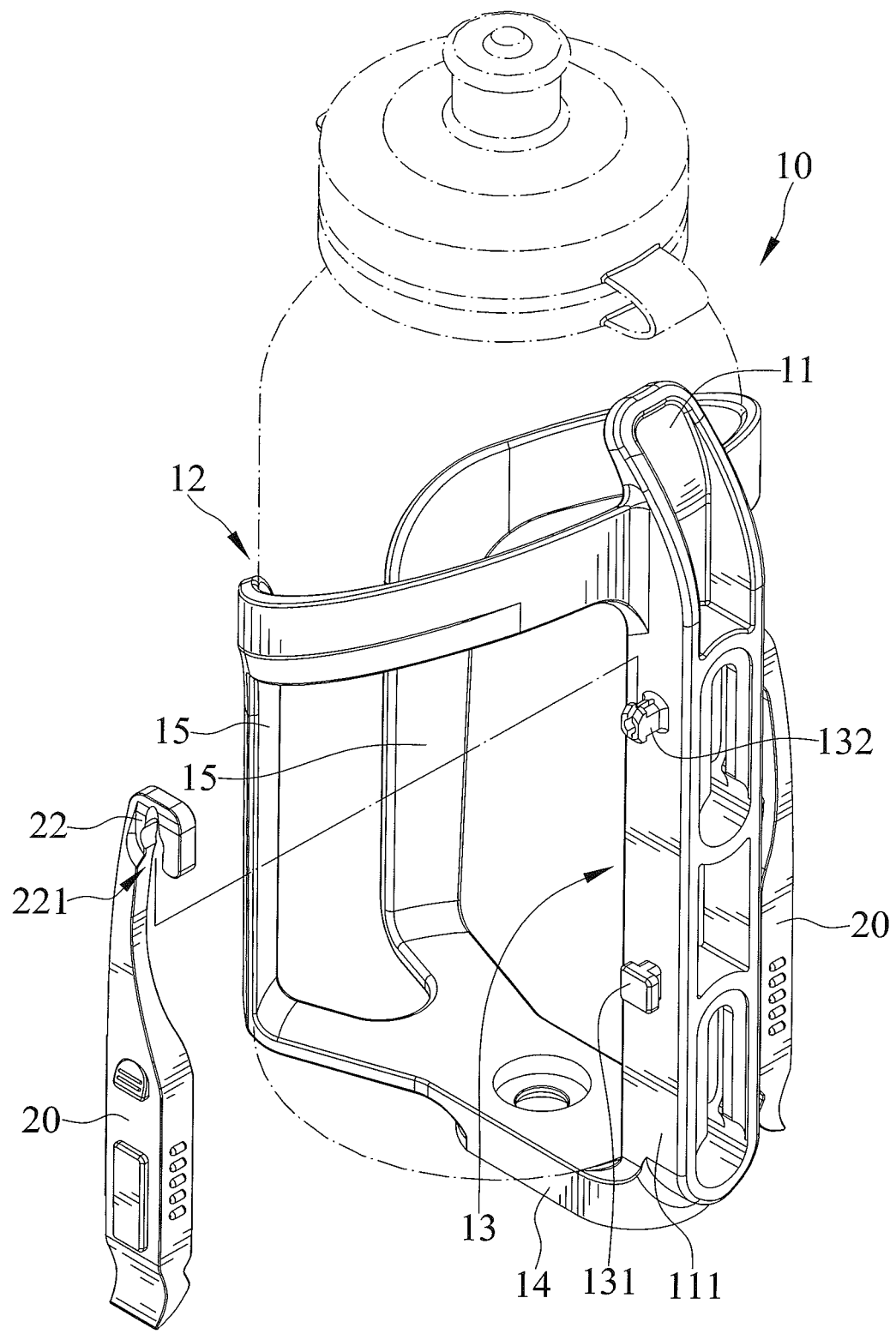
FIG. 6 shows a perspective view of the water bottle cage of FIG. 1, and illustrates the tire lever removed from the attaching device without the need to move a water bottle away from a receiving space.

The user can push the tire lever 20 in relation to the attaching device 13 along an arrow A shown in FIG. 5 to remove the tire lever 20 from the attaching device 13. The hooked portion 22 of the tire lever 20 is disengaged from the second convex portion 132 of the attaching device 13, and the joint portion 23 of the tire lever 20 is disengaged from the second section 1312 of the first convex portion 131. Thus, the tire lever 20 can be removed from the attaching device 13 without the need to move the water bottle away from the receiving space 12.

Now that the basic teachings of the water bottle cage have been explained, many extensions and variations will be obvious to one having ordinary skill in the art. For example, the bracket 11, the support 14, the struts 15, and the tire levers 20 can have shapes different from those shown in the figures.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A cage comprising:
  a bracket extending along a first axis and adapted to be attached to a frame of a bicycle, with the bracket including two first sides spaced from each other about a second axis perpendicular to the first axis and a second side extending parallel to the second axis and connected with the two first sides and facing a receiving space adapted for receiving a water bottle;
  at least one attaching device arranged on one of the two first sides, with the attaching device including a first convex portion extending from the one of the two first sides, with the at least one first convex portion including a first section and a second section integrally connected to each other, with the first section extending parallel to the second axis between the one of the two first sides and the second section, with the second section spaced from the one of the two first faces and extending perpendicular to the first and second axes and on opposite sides of the first section; and
  at least one tire lever including a slot with two shoulder portions extended from a lateral wall of the slot, with a joint portion formed between the two shoulder portions and a bottom of the slot engaging with the second section of the first convex portion, and with the two shoulder portions abutable against opposite sides of the first section to removably attach the at least one tire lever to the bracket.

2. The cage as claimed in claim 1, with the attaching device further including a second convex portion extending from the one of the two first sides, with the second convex portion including a third section and a fourth section integrally connected to each other, with the third section extending parallel to the second axis between the one of the two first sides and the fourth section, with the fourth section extending perpendicular to the second axis and spaced from and on opposite sides of the third section, and with the tire lever further including a hooked portion removably engaged with the second convex portion of the at least one attaching device.

3. The cage as claimed in claim 2, with the hooked portion having an opening removably engaged with the second convex portion.

4. The cage as claimed in claim 2, further comprising:
  a support formed with a bottom end of the bracket; and
  two symmetrical struts each having a bottom end integrally formed with one end of the support distal the bracket and a top end integrally formed with respective first side of the bracket, with the second side, the support, and the two struts forming the receiving space, with the first convex portion located adjacent to the support, and with the second convex portion located distal to the support.

5. The cage as claimed in claim 1, with the at least one attaching device comprising two attaching devices respectively arranged on the two first sides; and with the at least one lever comprising two tire levers removably attached to the two attaching devices.

\* \* \* \* \*